Dec. 21, 1965  G. SIMON  3,224,532
CALLIPER-TYPE DISK BRAKE
Filed Dec. 16, 1963
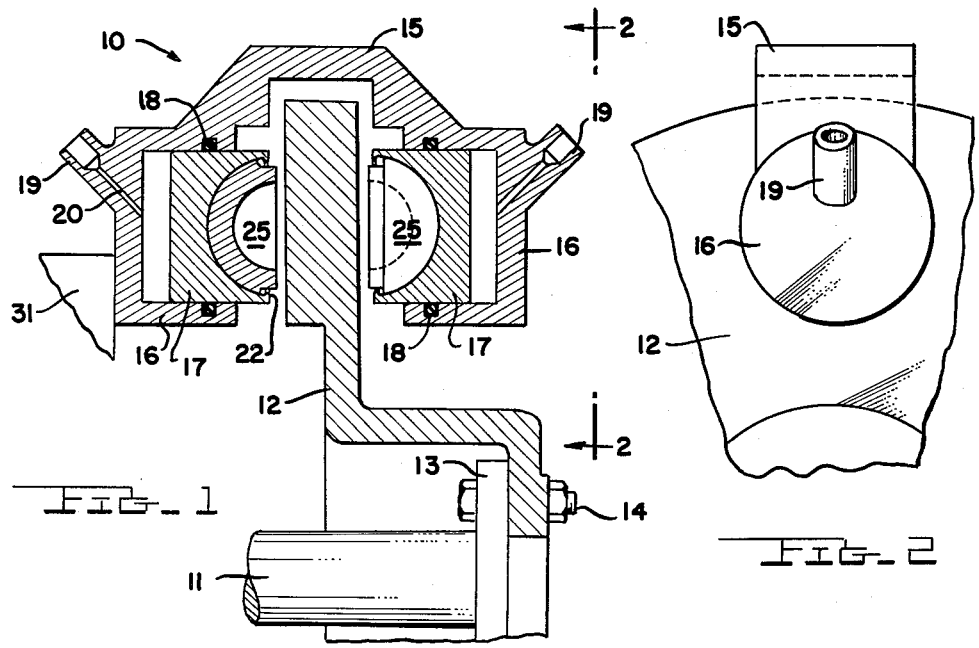
Fig. 1
Fig. 2
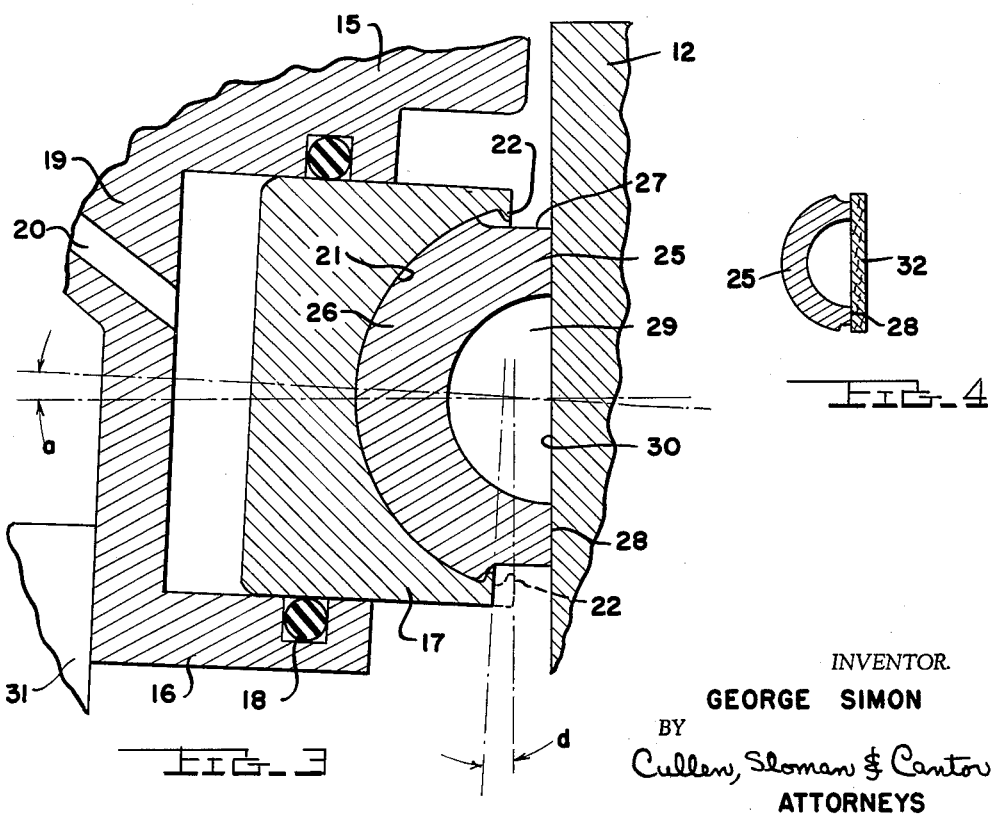
Fig. 3
Fig. 4
INVENTOR.
GEORGE SIMON
BY
Cullen, Sloman & Cantor
ATTORNEYS

United States Patent Office 3,224,532
Patented Dec. 21, 1965

1

3,224,532
CALLIPER-TYPE DISK BRAKE
George Simon, 6540 E. Palmer, Detroit, Mich.
Filed Dec. 16, 1963, Ser. No. 330,712
1 Claim. (Cl. 188—152)

This invention relates to a calliper-type disk brake.

In calliper-type disk brakes, used to brake the wheels of automotive vehicles and airplanes, and also for braking rotating members of various types of machinery, pressure members are forced against the opposite surfaces of a rotating disk which is connected to the rotating member. In prior devices, normal misalignments and inaccuracies result in some wobbling of the disk. This, plus resilient springing of the pressure member supports, frequently results in reduced contact between the pressure members and the disk, causing a reduction in designed braking area and a gouging or wearing of the contact areas.

Hence, it is an object of this invention to provide a simplified calliper-type disk brake wherein the pressure members are so formed as to be automatically self-adjusting to maintain a full face to face contact between the pressure members and the disk, thereby maintaining, at all times, the full designed area of contact, increasing braking efficiency, and reducing wear.

A further object of this invention is to provide a pressure member for calliper-type brakes having a free floating disk contacting face which automatically floats into proper relationship in contacting the disk regardless of misalignment and the like.

These and other objects and advantages of this invention will become apparent upon reading the following description, of which the attached drawings form a part.

In these drawings:

FIG. 1 is a partial, cross-sectional, elevational view of the disk brake herein.

FIG. 2 is an elevational, fragmentary, end view taken in the direction of arrows 2—2 of FIG. 1.

FIG. 3 is an enlarged fragmentary view of a portion of the brake and illustrates an example of misalignment of the parts in operation.

FIG. 4 illustrates a modified pressure member, per se.

With reference to FIG. 1, the brake 10 is used to brake rotation of a rotatable member, such as a shaft 11 upon which is fastened a braking disk 12 which is secured, by bolts 14, to flange 13 formed on the shaft. The disk may be an upset or bent type, as illustrated, or a flat disk, and any conventional means for securing the disk to the rotating member or shaft may be employed.

A pressure means is provided to press against the disk for braking purposes. This pressure means comprises a U-shaped yoke 15 which receives an edge portion of the disk 12. Upon the legs of the yoke are formed axially aligned hydraulic cylinders 16 each having a closed end, remote from the disk, and an open end adjacent the disk. Each cylinder contains a slidably movable piston 17 which is sealed therein by means of seals 18. Each cylinder is provided with a fitting 19 connected to a passageway 20 so that a hydraulic fluid line (not shown) may be secured to the fitting 19 for transmission of pressurized hydraulic fluid through the passageway 20 into the cylinder 16 for thereby forcing the pistons towards the disk.

2

As best seen in FIG. 3, the inner end of each piston, that is the end adjacent the disk, is formed with an inwardly opening socket 21 shaped as a segment of a sphere, such as slightly less than a hemisphere. An annular, inwardly extending flange 22 is provided at the mouth of the socket to restrict the diameter thereof.

Mounted upon the pistons are pressure members 25, each having a ball-end 26, shaped to correspond to the shape of the socket, and each having a short cylindrical portion 27 terminating in a flat pressure face 28. The diameter of the cylindrical portions are slightly less than the diameters of the mouths of the sockets and the largest diameters of the two ball-ends are greater than the diameters of the mouths so that the pressure members are snugly fitted and retained within the sockets for limited universal movement.

Preferably, the pressure members are hollow, being formed with cavities 29, so that the flat pressure faces 28 are annular in shape.

The flat pressure faces 28 are adapted to contact faces 30 of the disk 12. The yoke 15 is secured to a suitable fixed support 31 so that such contact results in braking the rotation of the disk.

FIG. 4 illustrates a modified pressure member having a pressure pad 32 formed of a conventional brake-type friction material, secured to its pressure face 28 for contacting the disk.

In operation, the disk rotates with the rotating member and, due to misalignments, will wobble slightly. Thus, the axes of the cylinders, which originally were substantially perpendicular to the disk face 30 move as shown by arrows $a$ in FIG. 3.

For braking, pressurized fluid is forced into the cylinders 16 to cause the pistons 17 to move towards the disk at which point the faces 28 of pressure members 25 contact the disk. Because of the inherent resiliency of the metal yoke, it will tend to spring apart slightly, resulting in a movement of the cylinder illustrated in exaggerated form by arrows $d$. However, the freely floating pressure faces 28 of the pressure members automatically and continuously self-adjust to compensate for such misalignments and still provide a full face to face contact with the disk.

In addition, because of the annular shapes of the pressure faces 28, initial contact between the pressure faces 28 and the disk surfaces 30, gives a slight twist or torque to the pressure members causing them to rotate slightly relative to the axes of the cylinders, which tends to reduce and more evenly distribute wear on the parts.

Upon release of the fluid pressure, pistons 17 release their pressure contact with the disk. If desired, springs (not shown) may be added to better retract the pistons away from the disk.

This invention may be further developed within the scope of the following attached claim. Accordingly, it is desired that the foregoing description be read as being merely illustrative of an operative embodiment of this invention and not in a strictly limited sense.

I now claim:

A disk brake comprising a rotatable brake disk having a braking face; a hydraulic cylinder arranged approximately axially perpendicular to said face and having an open end arranged closely adjacent to the outer edge of the disk face and a closed opposite end arranged remote from said face; a piston slidably fitted within said cylinder for movement towards and away from said face; a fluid passageway formed in said cylinder for transmitting pressurized fluid into the cylinder between the piston and the closed end of the cylinder for moving the piston towards the disk face; an approximately hemispherically shaped socket formed in the end of the piston adjacent said disk, and having an inwardly extending annular lip formed upon the edge defining the opening of said socket; a pressure member in the form of a short, hollow cylinder having a flat, open, annular shaped end and an opposite, closed ball shaped end, the ball end corresponding in size and shape to said socket and closely fitted within said socket for rotatable and rocking movement relative to said piston; the diameter of said ball end being greater than the diameter of the remaining portion of said cylinder, thus forming an annular shoulder arranged within the socket, with the shoulder normally being spaced a short distance from said lip, whereby said pressure member may rock within the socket until said shoulder contacts said lip; said flat, annular shaped end being arranged approximately parallel to said disk face for making face-to-face braking contact therewith upon movement of the piston towards said disk; whereby said pressure member rotates about its axis relative to said piston upon initially making contact with said disk and rocks within said socket to maintain said face-to-face contact with the disk despite the wobbling of the disk, relative to the cylinder, as the disk rotates.

References Cited by the Examiner

UNITED STATES PATENTS

| | | | |
|---|---|---|---|
| 210,608 | 12/1878 | Hunt | 287—87 |
| 445,775 | 2/1891 | Garfield | 287—90 |
| 2,862,580 | 12/1958 | Burnett | 188—73 |
| 2,915,147 | 12/1959 | Davis | 188—73 |
| 2,938,609 | 5/1960 | Burnett | 188—73 |
| 2,968,370 | 1/1961 | Ruet | 188—73 |
| 2,988,176 | 6/1961 | Du Bois | 188—73 |

FOREIGN PATENTS

| | | |
|---|---|---|
| 728,709 | 4/1960 | Great Britain. |
| 1,238,036 | 6/1960 | France. |
| 1,280,296 | 11/1961 | France. |

MILTON BUCHLER, *Primary Examiner.*

EUGENE G. BOTZ, ARTHUR L. LA POINT, *Examiners.*